United States Patent
Feisthammel et al.

(10) Patent No.: US 8,430,730 B2
(45) Date of Patent: Apr. 30, 2013

(54) MIXING APPARATUS FOR AN AIRCRAFT AIR-CONDITIONING SYSTEM

(75) Inventors: Horst Feisthammel, Überlingen (DE); Benjamin Plogmann, Merklingen (DE)

(73) Assignee: Liebherr-Aerospace Lindenberg GmbH (DE)

( * ) Notice: Subject to any disclaimer, the term of this patent is extended or adjusted under 35 U.S.C. 154(b) by 1272 days.

(21) Appl. No.: 12/008,934

(22) Filed: Jan. 15, 2008

(65) Prior Publication Data
US 2008/0210816 A1 Sep. 4, 2008

(30) Foreign Application Priority Data
Jan. 15, 2007 (DE) .......................... 10 2007 002 138

(51) Int. Cl.
B64D 13/00 (2006.01)
B64D 11/00 (2006.01)
B01D 15/12 (2006.01)
B01D 45/12 (2006.01)

(52) U.S. Cl.
USPC .............................. 454/76; 244/118.5; 55/447

(58) Field of Classification Search ...................... 454/76, 454/241; 165/113, 121–127, 139, 164–167
See application file for complete search history.

(56) References Cited

U.S. PATENT DOCUMENTS

| | | | | |
|---|---|---|---|---|
| 1,395,938 A * | 11/1921 | Barducci | ....................... | 454/269 |
| 2,396,208 A * | 3/1946 | Serre et al. | ..................... | 181/259 |
| 3,715,968 A * | 2/1973 | Henson | ......................... | 454/188 |
| 4,391,321 A * | 7/1983 | Thunberg | ........................ | 165/54 |
| 4,517,813 A | 5/1985 | Eggebrecht et al. | | |
| 6,139,425 A | 10/2000 | Yazici et al. | | |
| 6,145,588 A * | 11/2000 | Martin et al. | .................. | 165/166 |
| 6,612,365 B1 * | 9/2003 | Saishu et al. | ..................... | 165/54 |
| 6,971,607 B2 | 12/2005 | McColgan et al. | | |
| 7,441,588 B2 * | 10/2008 | Matsugi et al. | .................. | 165/54 |
| 2002/0121103 A1 | 9/2002 | Udobot et al. | | |
| 2005/0061913 A1 | 3/2005 | McColgan et al. | | |

FOREIGN PATENT DOCUMENTS

| | | |
|---|---|---|
| DE | 103 38 650 A1 | 3/2005 |
| EP | 0260736 | 3/1988 |
| FR | 959794 | 4/1950 |
| FR | 1 261 312 A | 4/1961 |
| WO | WO 2004/108174 A1 | 12/2004 |

OTHER PUBLICATIONS

International Search Report for EP 07023898.
German Search Report, Nov. 20, 2007.

* cited by examiner

*Primary Examiner* — Steven B McAllister
*Assistant Examiner* — Helena Kosanovic
(74) *Attorney, Agent, or Firm* — Carter, DeLuca, Farrell & Schmidt, LLP

(57) ABSTRACT

The invention relates to a mixing apparatus for an aircraft air-conditioning system comprising a plurality of supply lines and a plurality of discharge lines. In accordance with the invention, the mixing apparatus consists of the flow cross-section of pockets which are arranged above one another, which have a free cross-section in part and which have a diagonal partition wall in part.

18 Claims, 9 Drawing Sheets

MIXING APPARATUS FOR AN AIRCRAFT AIR-CONDITIONING SYSTEM

PRIORITY CLAIMED

Figure 1:
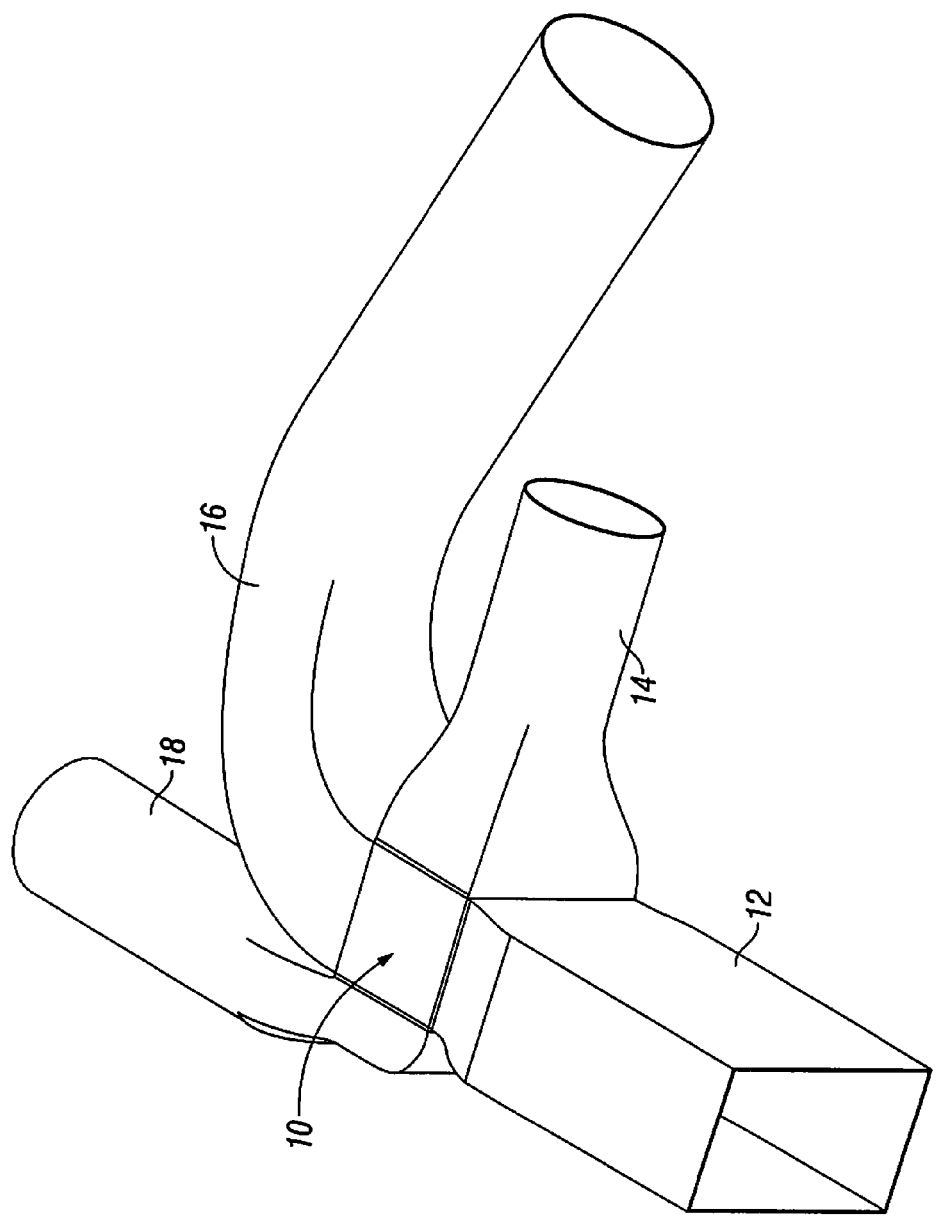

This application claims priority to German Patent Application No. DE 10 2007 002 138.2 filed Jan. 15, 2007.

The invention relates to a mixing apparatus for an aircraft air-conditioning system in accordance with the preamble of claim 1.

Aircraft air-conditioning systems serve the provision of conditioned air for the different areas of the aircraft, for example for the aircraft cabin or for the cockpit.

The present invention now specifically relates to a component for the mixing and/or splitting up of different air flows. In this connection, fresh air from the air-conditioning system is mixed with air from the aircraft cabin and supplied back to the cabin via a distributor system. At the same time, in accordance with an embodiment of the invention, some of the fresh air is branched off to supply it to the cockpit.

Under normal circumstances, the problem arises that all the components which project into the flow ice up under operating conditions in which the air is very cold and is saturated with moisture.

It has already become known to solve this problem from U.S. Pat. No. 6,971,607 B2 for a first supply line for fresh air from the air-conditioning system to be surrounded in its end region by a second supply line for returned air from the aircraft cabin, with both supply lines opening into a discharge line for the supply of mixed air to the aircraft cabin. Comparatively warm returned air from the aircraft cabin thus surrounds the cold fresh air flowing out of the air-conditioning system so that icing up can be prevented based on the heat transfer from the warm air. The discharge line for the supply of fresh air into the cockpit branches off from the first supply line for fresh air from the air-conditioning system. A very complex component for the mixing chamber hereby results.

It is now the object of the present invention to provide a mixing apparatus for an aircraft air-conditioning system which has a simple structure, on the one hand, and effectively prevents icing up in operation, on the other hand.

This object is satisfied in accordance with the invention by a mixing apparatus having the features of claim 1.

Accordingly, a mixing apparatus for an aircraft air-conditioning system comprises a first supply line for fresh air from the air-conditioning system and a second supply line for returned air from the aircraft cabin; furthermore, a discharge line is present for the supply of mixed air into the aircraft cabin and a discharge line for the supply of fresh air into the cockpit. The mixing apparatus consists, in accordance with the invention, of pockets which are arranged above one another in the flow cross-section and which, on the one hand, have a free cross-section to conduct the fresh air from the air-conditioning system from the first supply line for fresh air from the air-conditioning system into the discharge line for the supply of mixed air into the aircraft cabin and which, on the other hand, have a diagonal partition wall to conduct both the fresh air from the air-conditioning system into the discharge line for the supply of fresh air into the cockpit as well as returned air from the aircraft cabin into the discharge line for the supply of mixed air into the aircraft cabin.

Generally, other areas of the aircraft can also be connected to the mixing apparatus instead of the aircraft cabin and the cockpit.

The mixing apparatus in accordance with the invention therefore consists of a plurality of pockets which are provided with a diagonal metal partition sheet. Pockets through which the flow can flow without impediment are in turn arranged between these pockets. Some of the fresh air which flows onto the diagonal metal partition sheets is deflected to the side by the pockets. At the same time, on the other side of the metal partition sheets, the circulated air from the aircraft cabin flows in and is mixed after a deflection by 90° with the fresh air which has passed through the open pockets, with this air mixture flowing into the discharge line for the supply of mixed air into the aircraft cabin.

This arrangement guarantees that the pockets do not ice up since they are heated by the air returned from the aircraft cabin, that is, the recirculated air. At the same time, the pockets ensure that a good mixing takes place after the mixer due to the shear flow between the fresh air and the recirculated air. The icing up problem is thus solved in the downstream conduction system. The volume flow which is discharged proportionally as fresh air in the direction of the cockpit can be set based on the width of the pockets.

Particular advantages of the invention result from the further features which result from the dependent claims.

Accordingly, the differently structured pockets can preferably be arranged alternately over one another in a plurality of layers so that heat is introduced over the total height of the mixing apparatus by recirculated air.

Up to 10 to 20 pockets can also advantageously be arranged over one another, whereby in turn a uniform distribution of the air recirculated from the aircraft cabin and thus of the heat introduction is enabled.

Hot process air, so-called trim air, branched off from the air-conditioning system can preferably additionally be mixed into the discharge line for the supply of fresh air into the aircraft cabin.

In accordance with a further advantageous embodiment of the invention, the pockets can have a square base surface. In another particularly advantageous embodiment, the pockets have a substantially triangular base surface.

The pockets can also advantageously consist of sheet metal. A particularly simple construction embodiment of the mixing apparatus can hereby be realized. A further solution of the initially named object results from the feature combination of claim 9. It substantially corresponds to that in accordance with claim 1, but has no supply to a second area of the aircraft, for example to the cockpit.

Figure 2:
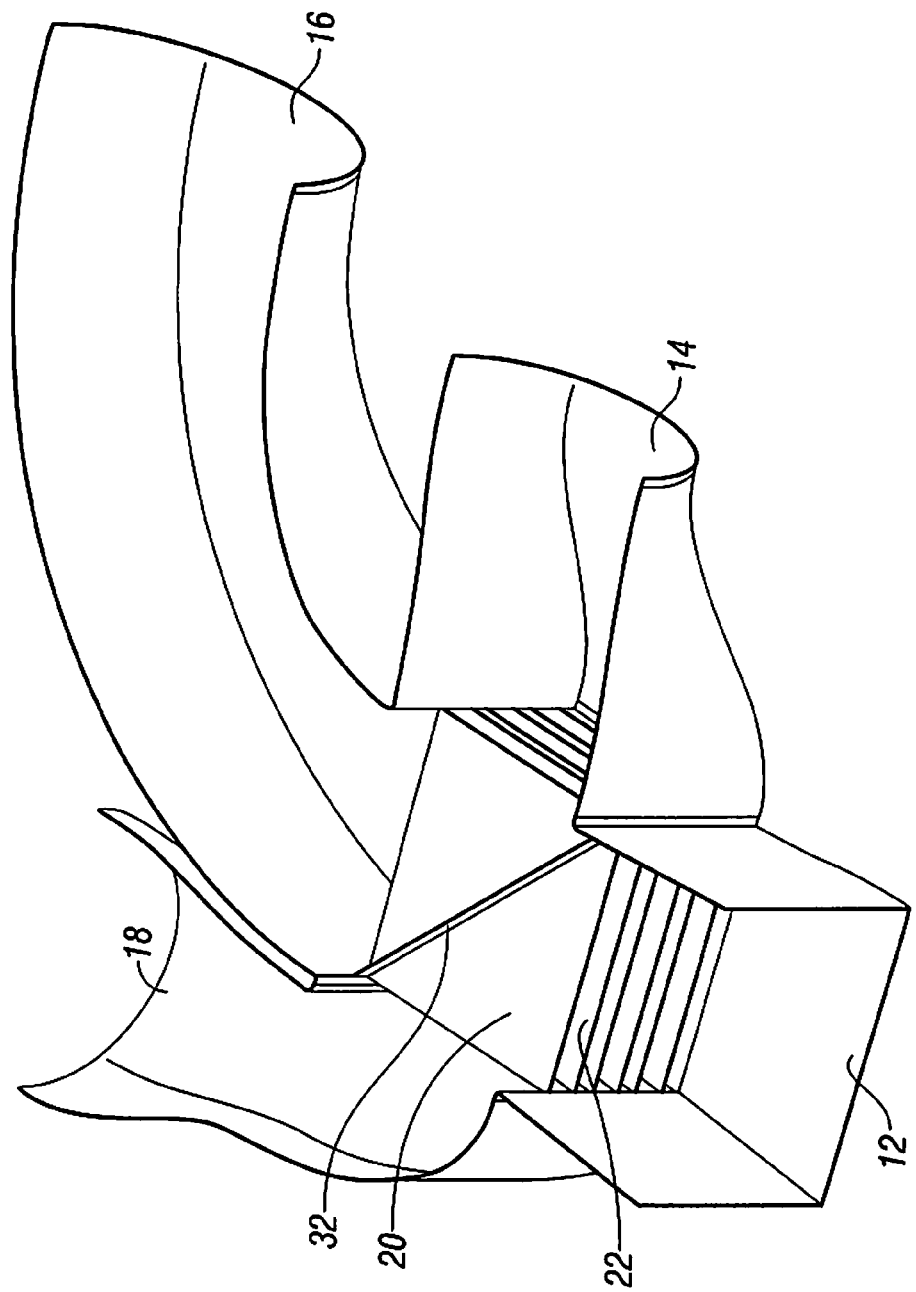
Figure 3:
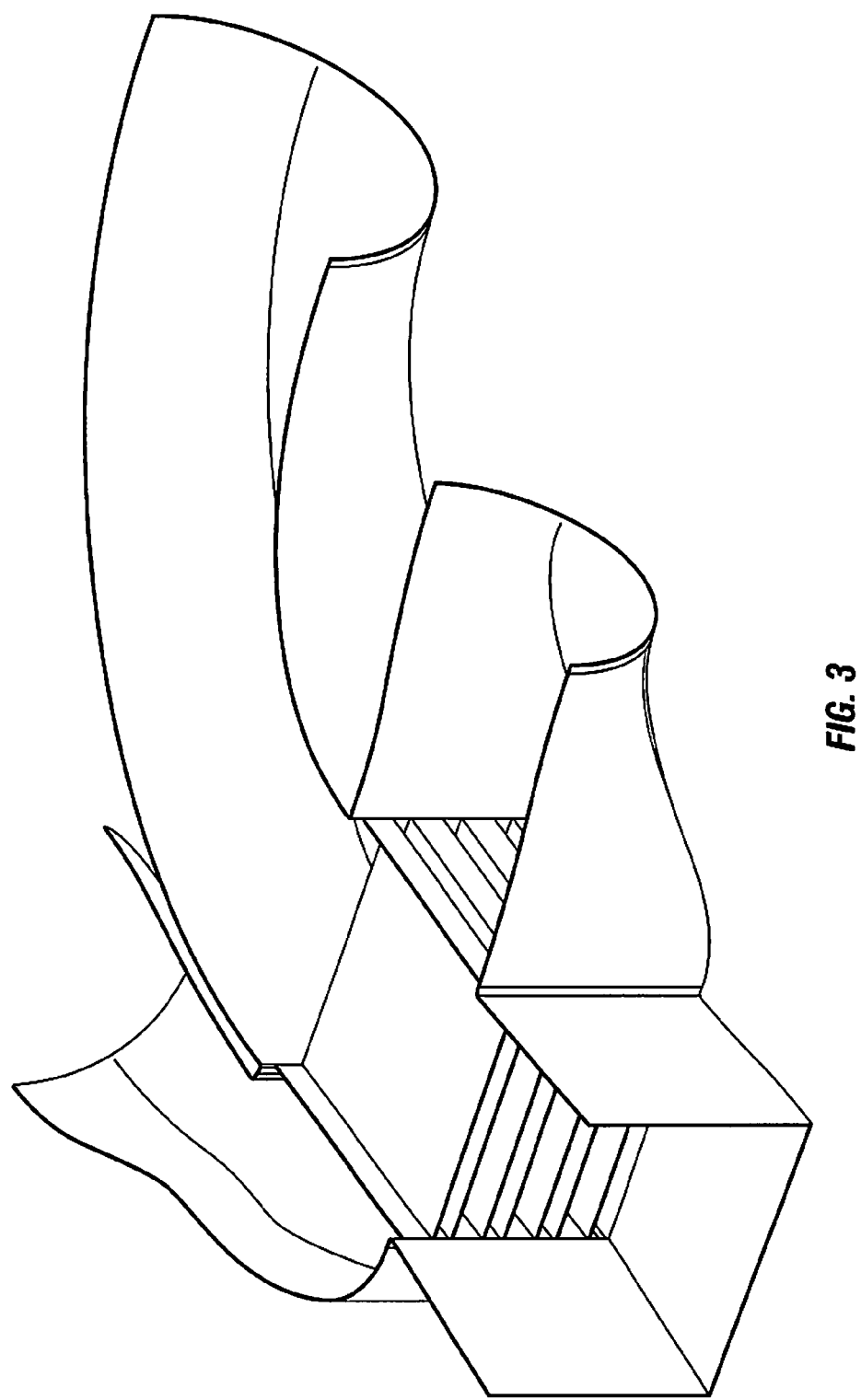
Figure 4:
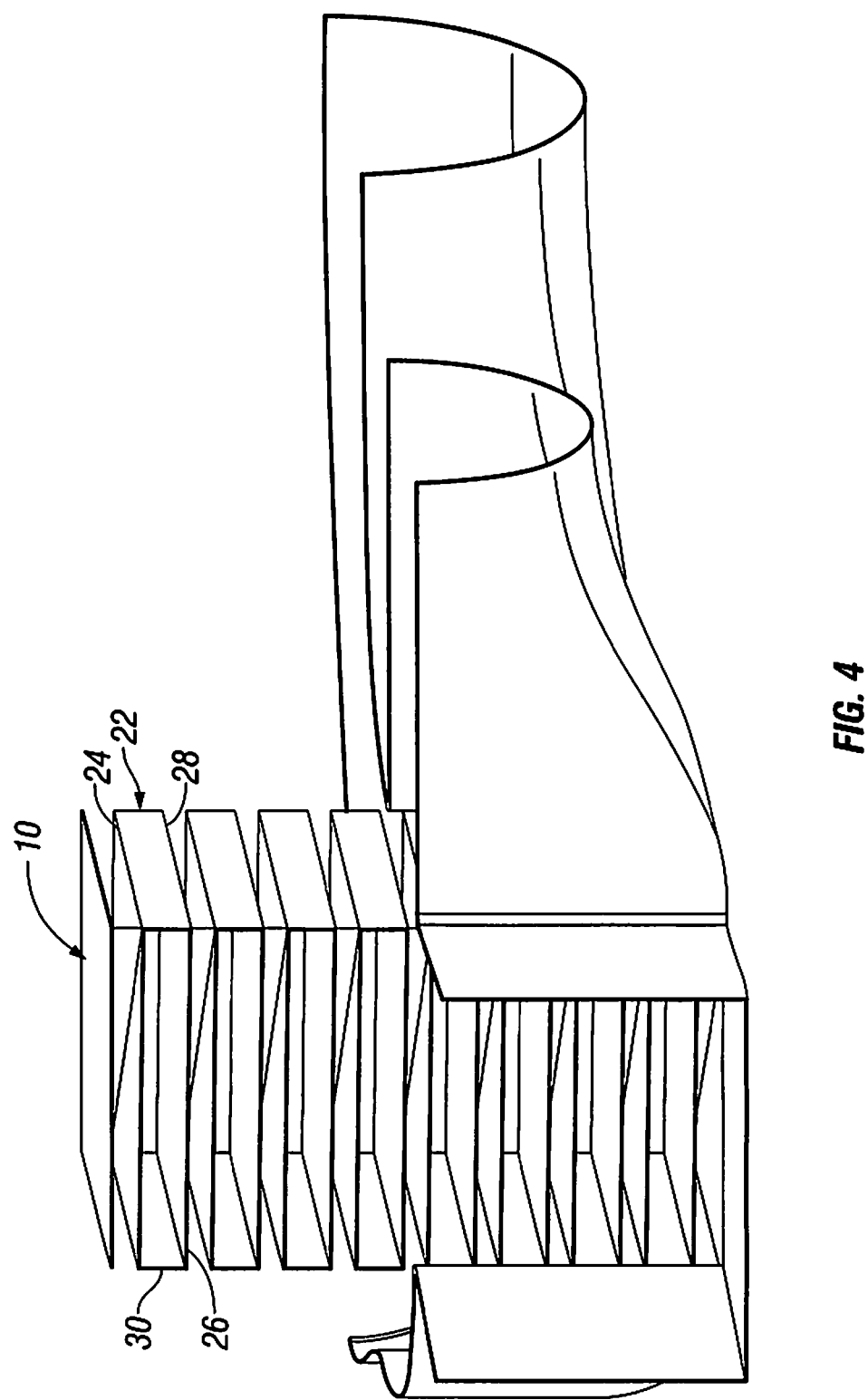
Figure 5:
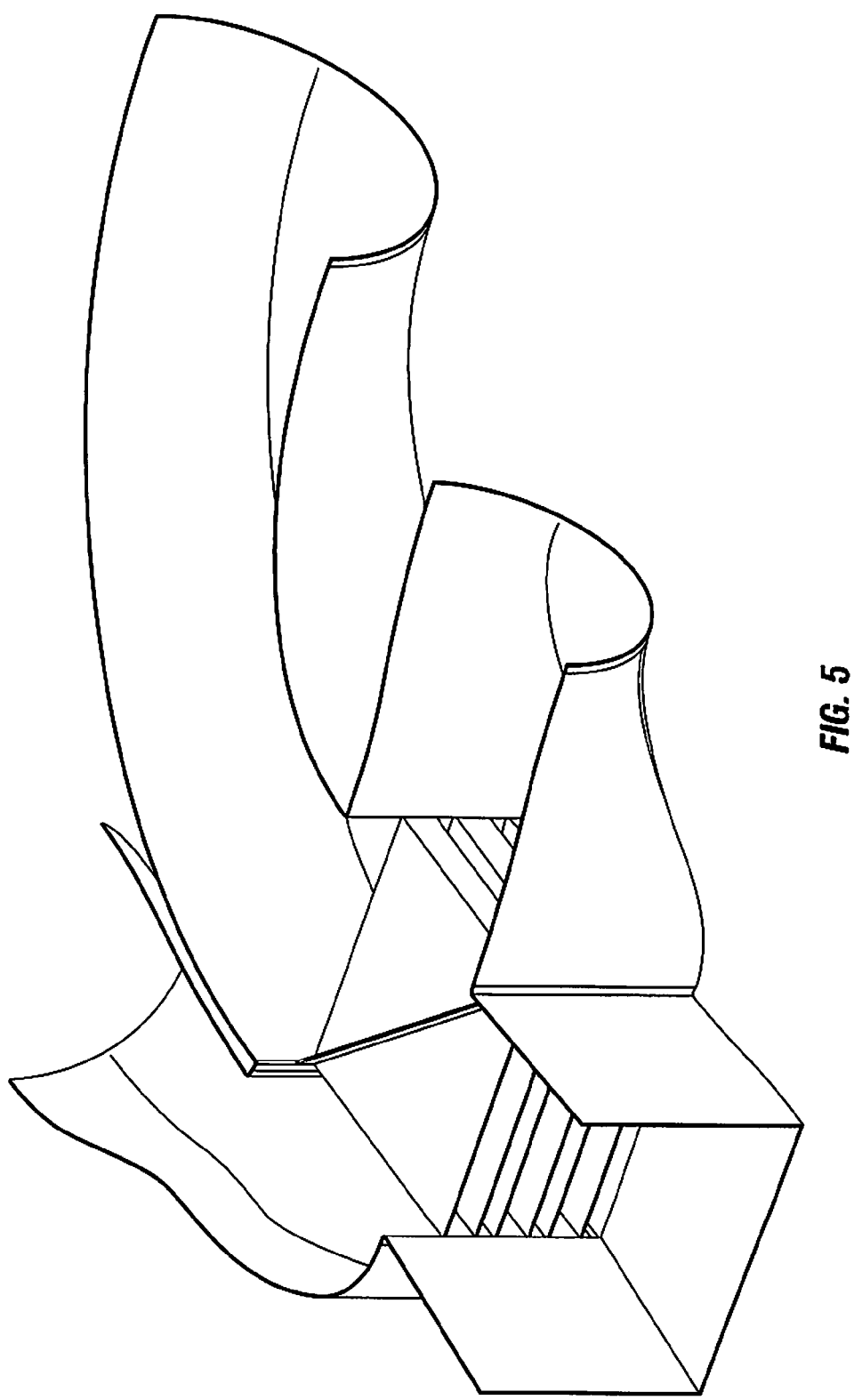
Figure 6:
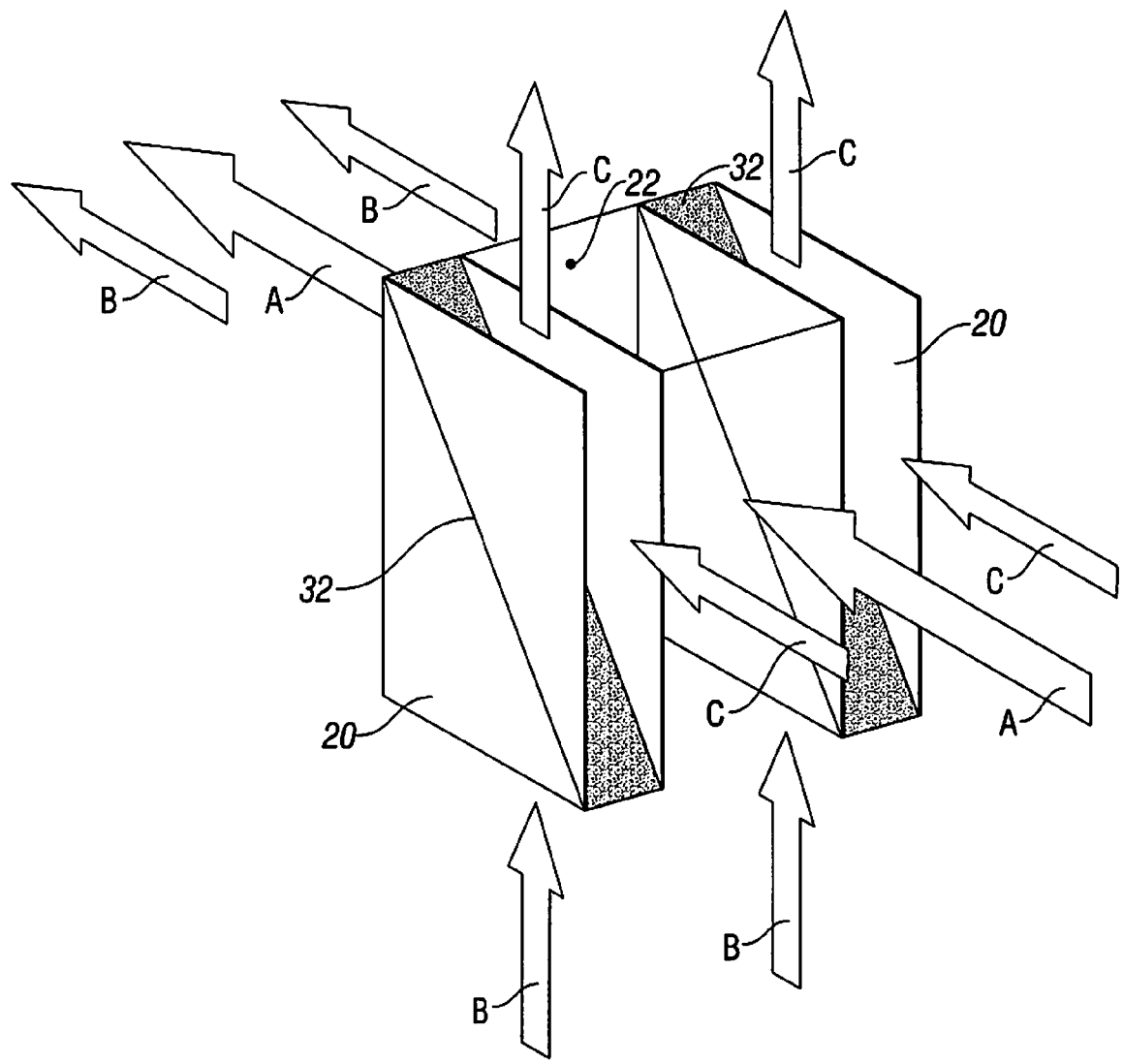
Figure 7:
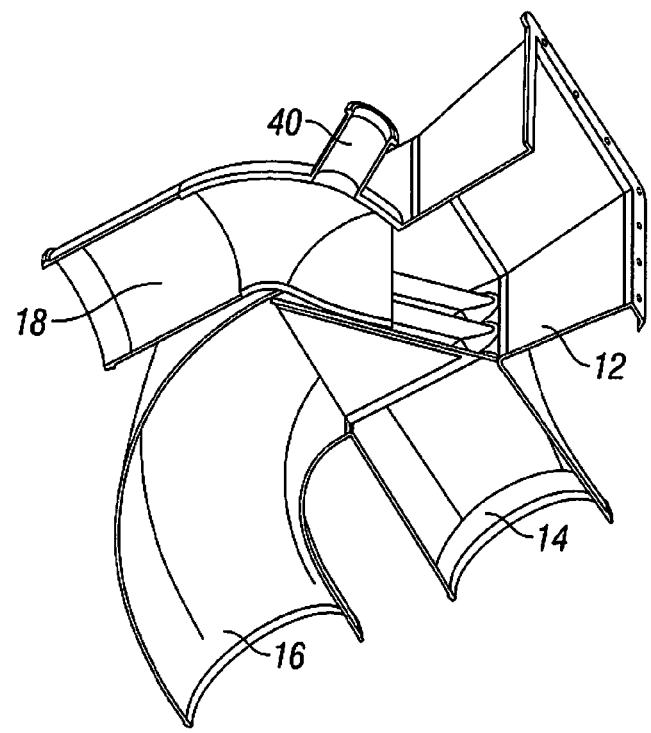
Figure 8:
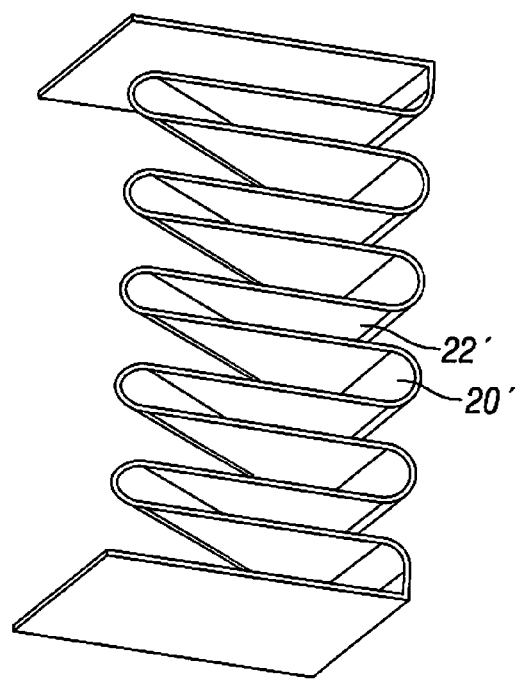
Figure 9:
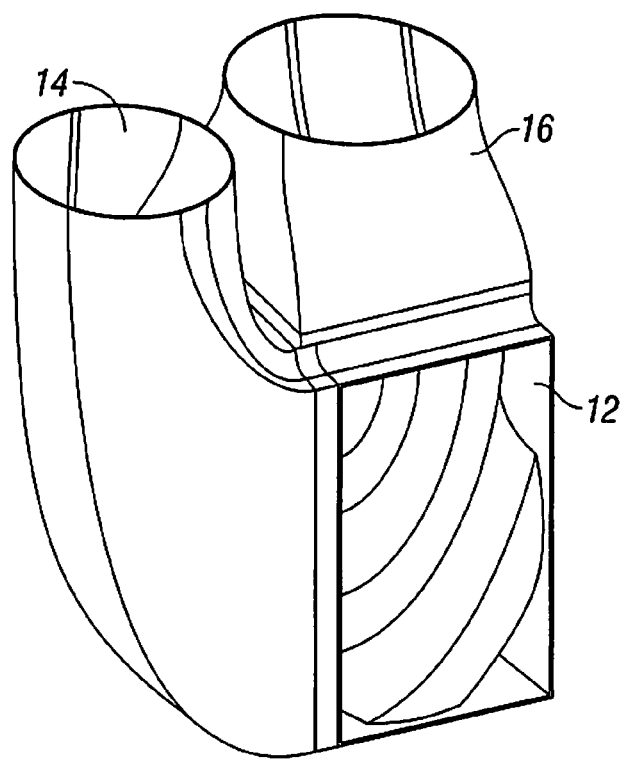
Figure 10:
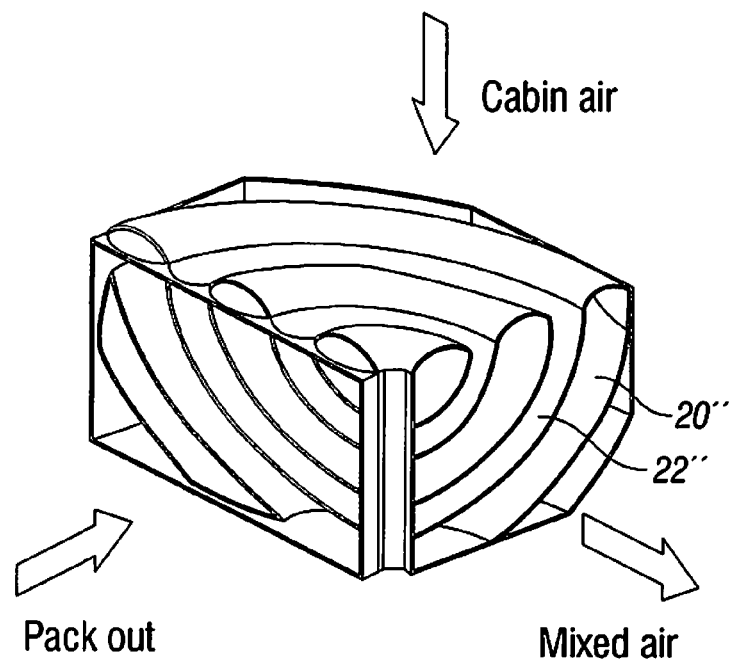
Figure 11:
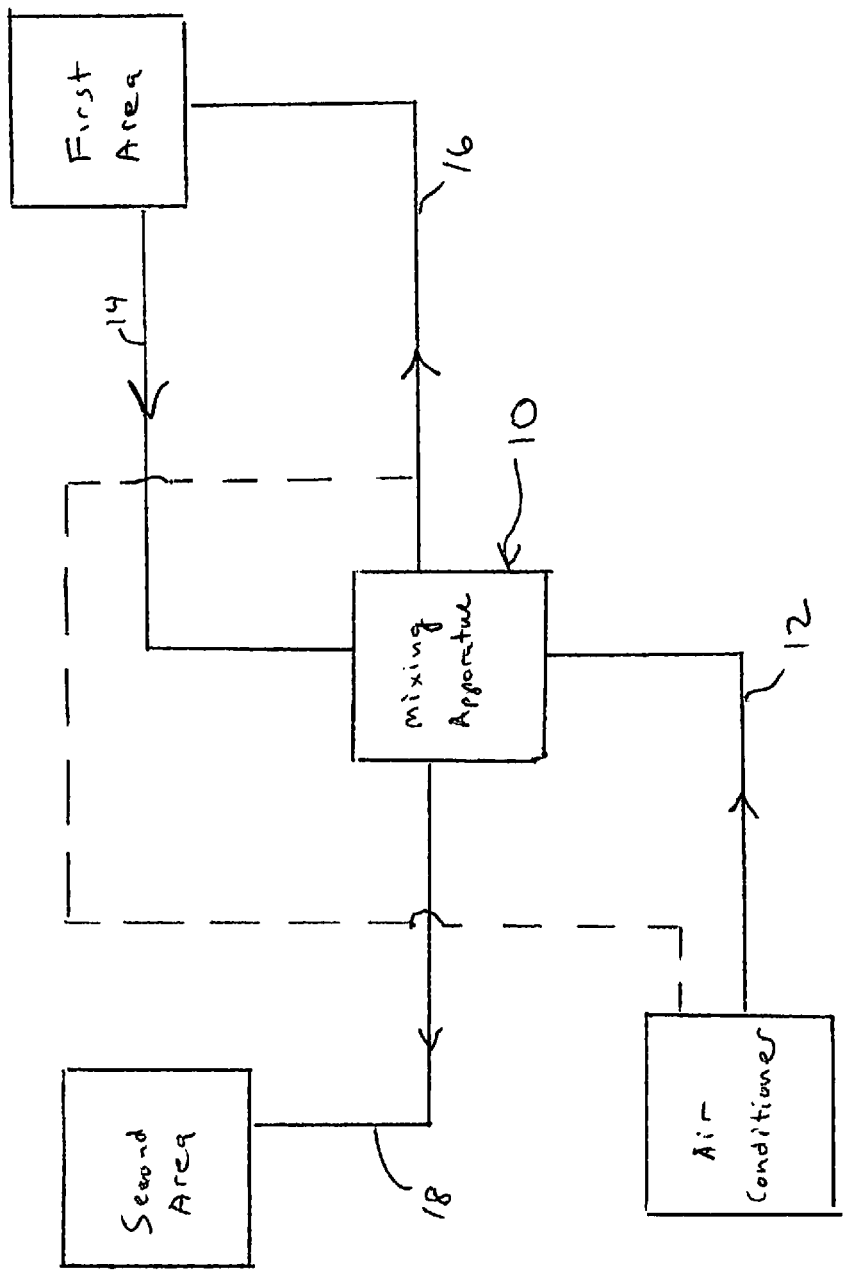

Further features, details and advantages of the invention will be explained in more detail with reference to an embodiment shown in the drawing. There are shown:

FIG. 1: a perspective arrangement of the mixing apparatus with the supply and discharge lines;

FIG. 2: a representation in accordance with FIG. 1 in cut-away form;

FIGS. 3-5: other perspective representations in accordance with FIG. 1 in cut-away form;

FIG. 6: a schematic view of the basic mode of action of the mixing apparatus in accordance with the present invention;

FIG. 7: a perspectively shown arrangement of the mixing apparatus in accordance with a second embodiment of the invention;

FIG. 8: a detail of the embodiment in accordance with FIG. 7;

FIG. 9: a perspectively shown arrangement of the mixing apparatus in accordance with a third embodiment of the invention; and FIG. 10: a detail of the embodiment in accordance with FIG. 9; and FIG. 11: a schematic illustration of an example of a system incorporating the mixing apparatus of the present disclosure.

A mixing apparatus comprising two supply lines 12 and 14 as well as two discharge lines 16 and 18 is shown in FIG. 1. The supply line 12 is the first supply line for fresh air from an air-conditioning system not shown in more detail here. The second supply line 14 is a supply line for returned air from the aircraft cabin not shown in more detail here. The first discharge line 16 is a discharge line for the supply of mixed air into the aircraft cabin and the second discharge line 18 is a discharge line for the supply of fresh air into the cockpit not shown in more detail here.

As can already be seen from FIG. 1 and the in detail from FIGS. 2 to 5, the mixing apparatus consists of a plurality of square pockets 20 and 22 arranged over one another. These pockets 20 and 22 are, as can in particular also be seen from FIG. 4, adapted to be very narrow. The pockets 22 consist of a sheet metal construction having in each case a cover 24 and base 26 which are each separated from one another by oppositely disposed side walls 28 and 30. The average cross-section is left free in the front and rear areas. These pockets 22 are arranged in the mixing apparatus 10 such that the fresh air flowing in the first supply line 12 from the air-conditioning system can flow without impediment into the first discharge line 16 for the supply of mixed air into the aircraft cabin. In contrast, due to the respective side walls 28 or 30, the inflow or outflow of air supplied from the second supply line out of the aircraft cabin or into the discharge line 18 for the supply of fresh air into the cockpit is prevented.

The pockets 20 are each formed between two pockets 22, with the respective metal base sheets and metal cover sheets of the pockets 22 correspondingly forming the metal base sheets and metal cover sheets of the pockets 20. Instead of the side walls 28 and 30, respective diagonal partition walls 32 are formed in the pockets 20, with the extent of the diagonal partition walls 32 being selected such that the air flowing in from the second supply line 14 for returned air from the aircraft cabin can enter into the pocket 20 and is deflected by approximately 90° by the partition wall 32 so that it is deflected into the first discharge line 16 for the supply of mixed air into the aircraft cabin, as can be seen from FIG. 2. In contrast, the air entering into the pocket 20 from the first supply line 12 for fresh air from the air-conditioning system is deflected by the diagonal metal partition sheet 32 by approximately 90° such that it is deflected into the second discharge line 18 for the supply of fresh air into the cockpit. Since the pockets 20 and 22 alternate, cold, fresh air from the air-conditioning system which flows in from the first supply line 12, passes through the pockets 22 and flows into the first discharge line 16 for the supply of mixed air into the aircraft cabin is mixed with recirculated air from the aircraft cabin which flows in through the second supply line 14 and is guided through the pockets 20.

The manner of mixing of the different flow portions can be seen from FIG. 6. A pocket 22 is shown centrally there through which the fresh air from the air-conditioning system passes, said fresh air represented by the arrow A. Recirculated air from the aircraft cabin, which is designated by B here, is mixed with the cold fresh air A in that it flows into the pockets 20 and is deflected there by means of the metal partition sheet 32. The fresh air A flowing out of the pockets 22 and the recirculated air B flowing out of the pockets 20 are thereby mixed in the first outflow line 16. In contrast, the portion of the fresh air originating from the air-conditioning plant is deflected along the diagonal metal partition sheets 32 and is guided into the second discharge line 18, said fresh air being designed by the arrows C in FIG. 6. There, in a manner not shown in any more detail, warm or hot trim air can be introduced for the prevention of icing up in this air, as is already known from the prior art, for example from U.S. Pat. No. 6,971,607 B2.

A second embodiment of the invention is shown in FIGS. 7 and 8. The mixing apparatus shown here substantially differs from the previously described mixing apparatus by the shape of the pockets. While the pockets 20 and 22 were substantially square in the first embodiment, the pockets 20' and 22' in the embodiment in accordance with FIGS. 7 and 8 are substantially triangular. Material and thus weight can be saved in this embodiment. The function corresponds to that of the first embodiment so that reference can be made to it. The inlet for the hot trim air into the second discharge line 18 is designated by 40 here.

A simplified embodiment of the invention is shown in FIGS. 9 and 10. In comparison with the aforesaid embodiments, the second discharge line 18 is missing here. The pockets 20" and 22" are made in arched form. Returned air from the aircraft cabin can hereby be mixed in a very compact manner with fresh air from the air-conditioning system.

The invention claimed is:

1. A mixing apparatus configured and dimensioned for use in an aircraft air-conditioning system, the mixing apparatus comprising a first supply line for fresh air from the air-conditioning system, a second supply line for returned air from a first area of the aircraft, a discharge line for supplying mixed air into the first area of the aircraft and a discharge line for supplying fresh air into a second area of the aircraft, wherein
the mixing apparatus further comprises a plurality of first and second pockets which are arranged above one another in an area of flow cross-section wherein the first pockets have an unobstructed cross-section to conduct a first portion of the fresh air from the air-conditioning system from the first supply line for fresh air from the air-conditioning system into the discharge line for the supply of mixed air into the first area of the air craft and each of the second pockets has a single diagonal partition wall to divert both a second portion of the fresh air from the air-conditioning system into the discharge line for the supply of fresh air into the second area of the aircraft as well as returned air from the first area of the air craft into the discharge line for the supply of mixed air in the first area of the aircraft, wherein a first surface of the partition wall diverts the second portion of the fresh air and a second surface opposite the first surface of the partition wall diverts the return air.

2. A mixing apparatus in accordance with claim 1, wherein the first area of the aircraft is the aircraft cabin and the second area of the aircraft is the cockpit.

3. A mixing apparatus in accordance with claim 1 wherein the the first and second pockets are arranged alternately above one another in plurality of layers.

4. A mixing apparatus in accordance with claim 1, wherein 10 to 20 pockets are arranged above one another.

5. A mixing apparatus in accordance with claim 1, wherein hot process air branched off from the air-conditioning system is additionally mixed into the discharge line for the supply of fresh air into the first area.

6. A mixing apparatus in accordance with claim 1 wherein the pockets have a square base surface.

7. A mixing apparatus in accordance claim 1 wherein the pockets have a substantially triangular base surface.

8. A mixing apparatus in accordance with claim 1 wherein the pockets are made of sheet metal.

9. A mixing apparatus configured and dimensioned for use in an aircraft air-conditioning system, the mixing apparatus comprising a first supply line for fresh air from the air-conditioning system, a second supply line for returned air from an a first area of the aircraft and a discharge line for supplying mixed air into the first area of the aircraft and a discharge line for supplying fresh air into a second area of the aircraft, wherein the mixing apparatus further comprises a plurality of first and second pockets which are arranged next to one another in a flow cross-section and which are configured to respectively have (i) an unobstructed cross-section to conduct a first portion of the fresh air from the air-conditioning system from the first supply line for fresh air from the air-conditioning system into the discharge line for the supply of mixed air into the first area of the aircraft and (ii) a partition wall to divert both a second portion of the fresh air from the air-conditioning system into the discharge line for the supply of fresh air into the second area of the aircraft as well as returned air from the first area of the aircraft into the discharge line for the supply of mixed air in the first area of the aircraft, wherein a first surface of the partition wall diverts the second portion of the fresh air and a second surface opposite the first surface of the partition wall diverts the return air.

10. A method of mixing air in an aircraft comprising:
providing an aircraft which includes an air conditioning system and an air mixing apparatus, the air mixing apparatus including a first supply line for fresh air from the air-conditioning system, a second supply line for returned air from within a first area of the aircraft, a discharge line for supplying mixed air into the first area of the aircraft and a discharge line for supplying fresh air into a second area of the aircraft, wherein the mixing apparatus includes a plurality of pockets which are arranged next to one another in an area of flow cross-section, some pockets having (i) an unobstructed cross-section to conduct a first portion of the fresh air from the air-conditioning system from the first supply line for fresh air from the air-conditioning system into the discharge line for supplying mixed air into the first area of the air craft and other pockets having (ii) a single partition wall to divert both a second portion of the fresh air from the air-conditioning system into the discharge line for supplying fresh air into the second area of the aircraft as well as to divert returned air from within the first area of the aircraft into the discharge line for supplying mixed air into the first area of the aircraft;

directing air from the air conditioner into the first supply line of the mixing apparatus;

directing returned air from the first area of the aircraft to the second supply line of the mixing apparatus; and allowing air from the mixing apparatus to flow out of the discharge lines into the air craft.

11. The method of mixing air in an aircraft according to claim 10 wherein the discharge line for the supply of mixed air into the aircraft is a first discharge line for the supply of mixed air into a first area of the aircraft, the air mixing apparatus further including a second discharge line for the supply of fresh air into a second area of the aircraft, wherein the partition wall conducts both the fresh air from the air-conditioning system into the discharge line for the supply of fresh air into the second area of the aircraft as well as returned air from the first area of the air craft into the discharge line for the supply of mixed air into the first area of the aircraft.

12. The method of mixing air in an aircraft according to claim 10 wherein the plurality of pockets which are arranged next to one another are arranged in a vertical stack.

13. The method of mixing air in an aircraft according to claim 11 wherein the first area of the aircraft is the aircraft cabin and the second area of the aircraft is the cockpit.

14. The method of mixing air in an aircraft according to claim 10, wherein hot process air branched off from the air-conditioning system is additionally mixed into the discharge line for the supply of fresh air into the first area.

15. The method of mixing air in an aircraft according to claim 10 wherein the pockets have a square base surface.

16. The method of mixing air in an aircraft according to claim 10 wherein the pockets have a substantially triangular base surface.

17. The method of mixing air in an aircraft according to claim 10 wherein the pockets are made of sheet metal.

18. The method of mixing air in an aircraft according to claim 10 wherein the pockets which have an unobstructed cross-section and the pockets which have a partition wall are arranged alternately above one another in plurality of layers.

* * * * *